United States Patent [19]
Van Buskirk

[11] 3,909,129
[45] Sept. 30, 1975

[54] DOCUMENT FEEDING APPARATUS
[75] Inventor: Warren T. Van Buskirk, Rochester, N.Y.
[73] Assignee: Xerox Corporation, Stamford, Conn.
[22] Filed: Apr. 26, 1974
[21] Appl. No.: 464,725

[52] U.S. Cl. ................. 355/27; 271/274; 355/51
[51] Int. Cl.² ................ G03B 27/32; G03B 27/52; B65H 5/16
[58] Field of Search .......... 355/8, 50, 51, 27; 271/9, 271/54, 61, 274

[56] References Cited
UNITED STATES PATENTS
| | | | |
|---|---|---|---|
| 3,499,710 | 3/1970 | Sahley | 355/50 X |
| 3,695,754 | 10/1972 | Washio et al. | 355/51 X |
| 3,743,406 | 7/1973 | Komori et al. | 355/8 |

Primary Examiner—Richard A. Wintercorn
Attorney, Agent, or Firm—Paul Weinstein; Clarence A. Green; James J. Ralabate

[57] ABSTRACT

An apparatus for feeding individual sheets over a transparent platen. Means are provided for feeding the sheets over the platen comprising at least one roll. The apparatus also includes means for biasing the roll against the platen with a first force normal to the platen when no sheet is being fed and for biasing the roll against the platen with a second force normal to the platen when a sheet is being fed. The second force is greater than the first force. A reproducing apparatus including the above sheet feeding apparatus is also provided.

16 Claims, 7 Drawing Figures

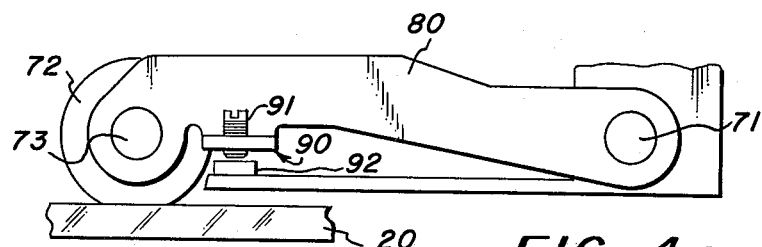
FIG. 4a
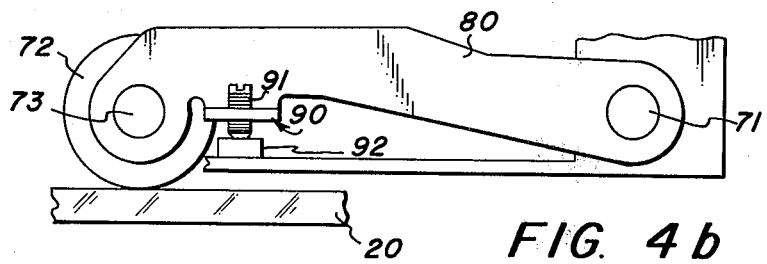
FIG. 4b
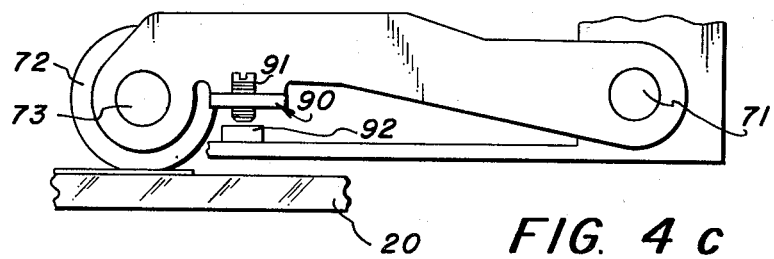
FIG. 4c
FIG. 4

DOCUMENT FEEDING APPARATUS

BACKGROUND OF THE INVENTION

This invention relates to an apparatus for feeding individual sheets over a transparent platen. The apparatus is particularly adapted for use as a document feeder for a reproducing machine.

Numerous document feeders for use with reproducing machines are known as exemplified by U.S. Pat. Nos., 3,499,710, granted Mar. 10, 1970, to Sahley; 3,556,512, granted Jan. 19, 1971, to Fackler; 3,674,363, granted July 4, 1972, to Baller et al, and 3,790,158, granted Feb. 5, 1974, to Summers et al. These patents are representative of the broad prior art in this area directed to document feeders for placing a document on a transparent viewing platen for viewing by the optics of a reproducing machine for making copies of the document. The first named patent shows the use of friction rolls for transporting the document over the platen, and the remaining patents show the use of belt type transport devices.

In U.S. Pat. Nos. 3,685,905, granted Aug. 22, 1972, to Marshall et al., and 3,747,918, granted July 24, 1973, to Margulis et al., belt type feeders are provided with means internally of the belt to bias it against the platen.

An alternative type document feeder for use with a reproducing machine is that set out in U.S. application Ser. No. 367,996, filed June 7, 1973, to Hoppner. In accordance with the subject application a scanning optical system is fixed adjacent one margin of a transparent viewing platen and a document feeder is positioned overlying the optics to advance documents past the fixed optical system at a speed synchronized to the speed of an image receiving member.

It is a problem common to all document feeding systems wherein rolls or belts bear against a platen or against the document supported on the platen that abrasion of the transparent platen results with consequent defects in the resulting copies.

The document feeding apparatus employed in the IBM Copier II employs a combination of feed belts and back-up belts similar to that shown in IBM Technical Disclosure Bulletin, Vol. 15, No. 2, July 1972, at page 389. The disclosure bulletin indicates that the outer feed belts by themselves do not adequately insure feeding since they exert a low pressure against the document. Therefore, back-up belts which move in synchronized relationship to the outer feed belts are positioned within the loop of the feed belts and provide an additional urging force toward the direction of feed, and a normal assisting force to improve the feeding of the sheet. It is possible that the dual belt arrangement employed in the IBM Copier II will reduce platen abrasion due to the feed belts alone because of the generally lower normal force they impart to the platen, or a sheet fed over the platen.

However, the system employed is a complex one requiring separate outer and inner belts. Most document feeders, as for example, those shown in the previously noted patents employ one or more single belts with no back-up belts or one or more sets of rolls. It is highly desirable that some system be found for reducing platen abrasion for these other types of document feeding apparatuses.

Another problem which sometimes occurs with respect to document feeders for moving original exposure is a skips and smears copy defect. For example, the document feeder of the above-noted application moves the document at a synchronized speed to the photosensitive surface or other image receiving surface to provide a flowing light image of the original which is projected on the photosensitive surface. The document feeder of the application includes a first set of pinch rolls which advance the document over the viewing portion of the transparent platen and a second set of feed rolls overlying the platen which receive the lead edge of the sheet and then act upon the sheet to continue its transport after the trailing edge has left the pinch rolls. As the lead edge of the sheet intercepts the rolls overlying the platen, there can be a momentary hesitation of the sheet which can result in a skip or smear in the image on the resulting copy sheet. The effect has been found to depend on the normal force exerted by the rolls against the platen when no sheet is being fed.

SUMMARY OF THE INVENTION

In accordance with this invention an apparatus is provided for feeding individual sheets over a transparent platen. The apparatus includes means for feeding the sheets over the platen wherein the feeding means comprises at least one roll and means for biasing the roll against the platen with a first force normal to the platen when no sheet is being fed and for biasing the roll against the platen with a second force normal to the platen greater than the first force when a sheet is being fed.

The roll may have a web or a belt supported about its outer periphery. For example, it could comprise the pulley of a belt transport type document feeder.

Preferably, the biasing means comprises means for biasing the roll against the platen with the second force and means for reducing the second force to a first force when no sheet is being fed. The reducing means preferably comprises a means supported by the feeder for absorbing a portion of the second force to obtain the lower first force.

The sheet feeding apparatus of this invention is particularly useful as a document feeder for a reproducing machine particularly an automatic xerographic tpye machine. The apparatus of this invention provides an improvement with respect to the reduction of abrasion of the platen under the feed roll or rolls. The apparatus also eliminates or substantially reduces skips and smears type copy defects for document feeders providing moving original image exposure.

Accordingly, it is an object of this invention to provide an improved apparatus for feeding sheets over a transparent platen.

It is a further object of this invention to provide an apparatus as above including means for varying the normal force exerted by the feed means upon the platen depending on whether or not a sheet is being fed.

It is a still further object of this invention to provide a reproducing machine including the above-noted sheet feeding apparatus.

These and other objects will become more apparent from the following description and drawings.

BRIEF DESCRIPTION OF THE DRAWINGS

FIG. 4 is a series of partial side views of the sheet feeding apparatus of FIG. 1 illustrating the operation of the apparatus of this invention.

DETAILED DESCRIPTION OF THE PREFERRED EMBODIMENTS

In accordance with this invention an apparatus is provided for feeding individual sheets over a transparent platen. The apparatus includes means for feeding the sheets over the platen. The feeding means comprises at least one roll and means are provided for biasing the roll against the platen with a first force normal to the platen when no sheet is being fed and for biasing the roll against the platen with a second force normal to the platen which is greater than the first force when a sheet is being fed.

The apparatus of this invention has been applied to a reproducing machine of the type set out in the above-noted U.S. application Ser. No. 367,996. For purposes of example therefor, specific reference will now be made to the reproducing machine of the aforenoted application and to the document feeding apparatus in accordance with this invention incorporated in it. While the document feeder which will be described with reference to that machine is of the type for providing a moving original type exposure system, the invention is not necessarily limited thereto. The document feeding apparatus of this invention may be applied to stationary original exposure systems as well.

Figure 1:
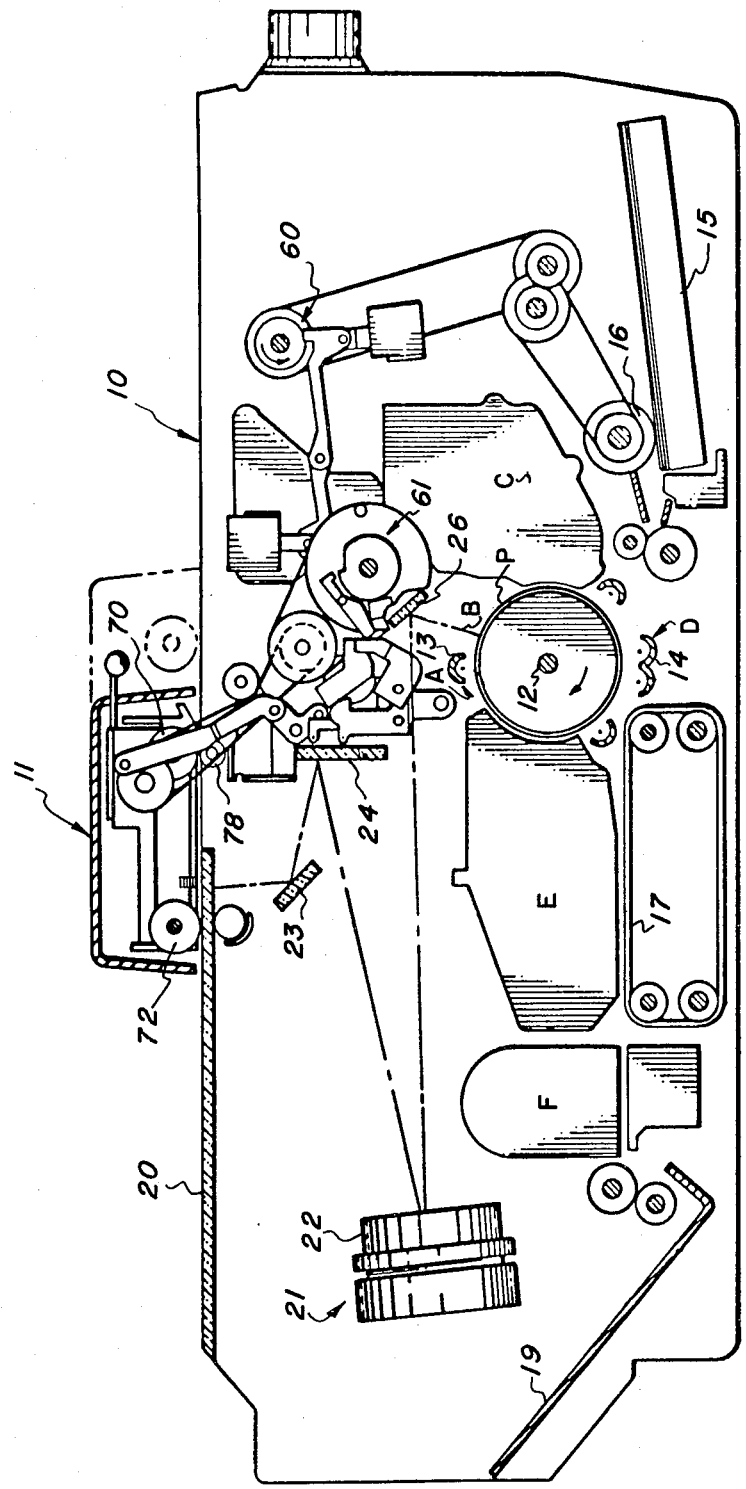
FIG. 1 is a schematic representation of a reproducing machine including a sheet feeding apparatus in accordance with one embodiment of the present invention.

Referring now to FIG. 1, there is illustrated a schematic side view of a compact automatic xerographic copying machine 10 incorporating the sheet feeding apparatus 11 of the present invention. The term compact copier, as herein used, refers to a machine of relatively small size, as for example, a desk type copier. Basically, the xerographic processor includes a rotatably mounted photoconductive drum P which is supported upon a horizontally extended shaft 12. The drum is driven in the direction indicated whereby its photoconductive surface is caused to pass sequentially through a series of xerographic processing stations.

Because the xerographic process is widely known and used in the art, the various processing steps involved will be briefly explained below in reference to FIG. 1. Initially, the photoconductive drum surface is uniformly charged by means of a corona generator 13 positioned within a charging station A located at approximately the 12 o'clock drum position. The charged drum surface is then advanced into an imaging station B wherein a flowing light image of an original document to be reproduced is projected onto the charged drum surface thus recording on the drum a latent electrostatic image containing the original input scene information. Next, subsequent to the exposure step in the direction of drum rotation is a developing station C wherein the latent electrostatic image is rendered visible by applying an electroscopic marking powder (toner) to the photoreceptor surface in a manner well known and used in the art. The now visible image is then forwarded into a transfer station D wherein a sheet of final support material is brought into overlying moving contact with the toner image and the image transferred from the plate to the support sheet by means of a second corona generator 14.

In operation, a supply of cut sheets are supported within the machine by means of a removable paper cassette 15. A pair of feed rollers 16 are arranged to operatively engage the uppermost sheet in the cassette so as to first separate the top sheet from the remainder of the stack and then advance the sheet into the transfer station in synchronous moving relationship to the developed image on the photoconductive plate surface. The motion of the feed rollers is coordinated with that of the rotating drum surface, as well as the other machine components through the main drive system whereby the support sheet is introduced into the transfer station in proper registration with the developed toner image supported on the xerographic plate. For further information concerning this type of sheet feeding mechanism, reference is had to copending U.S. Pat. application Ser. No. 205,911 filed in the name of Punnett et al.

After transfer, but prior to the reintroduction of the imaged portion of the drum into the charging station, the plate surface is passed through a cleaning station E wherein the residual toner remaining on the plate surface is removed. The removed toner particles are collected within a container where they are stored subject to periodic removal from the machine.

Upon completion of the image transfer operation, the toner bearing support sheet is stripped from the drum surface and placed upon a moving vacuum transport 17 which serves to advance the support sheet into a thermal fusing station F wherein the toner image is permanently fixed to the sheet. The copy sheet with the fused image thereon is forwarded from the fuser into a collecting tray 19 where the sheet is held until such time as the operator has occasion to remove it from the machine. Normally, when the copier is operated in a conventional mode, the original document to be reproduced is placed image side down upon a horizontal transparent viewing platen 20 and the stationary original then scanned by means of the moving optical system 21. The scanning system 21 fundamentally consists of a stationary lens system 22 positioned below the right hand margin of the platen as viewed in FIG. 1, and a pair of cooperating movable scanning mirrors 23 and 24. The lens is basically a half-lens objective having a reflecting surface at the stop position to simulate a full lens system. The two mirrors are slidably supported between a pair of parallel horizontally aligned guide rails (not shown). For a further description and greater details concerning this type of optical scanning system reference is had to copending U.S. application Ser. No. 259,181 Now U.S. Pat. No. 3,832,057 filed in the name of Shogren.

In practice, mirror 23, herein referred to as the full rate scan mirror, is caused to move from a home position, directly below the left hand margin of the platen to an end of scan position below the opposite margin of the platen. The rate of travel of the scan mirror is equal to the peripheral speed of the rotating xerographic drum surface P. The second mirror 24 is simultaneously caused to move in the same direction as the scanning mirror at half the scanning rate. As the two mirrors sweep across the platen surface, an image of each incremental area thereon viewed by the scanning mirror is reflected towards the second mirror which, in turn, redirects the image back to the half lens system. The reflecting surface, positioned at the lens stop position, reverses the entering light rays and redirects the light rays back towards a stationary mirror 26 positioned directly above the drum surface at the exposure station B. In this manner a flowing light image containing the original input scene information is focused upon the charged photoconductive plate.

A wind up spring (not shown) is provided to restore the moving mirrors to a start of scan condition.

The copying apparatus 10 shown in FIG. 1 is provided with a document feeder 11 in accordance with this invention. The document feeder 11 is movable between a first stored position adjacent to the viewing platen 20 and a second operative position over the platen surface. Commensurate with the positioning of the feeder assembly over the platen, the moving optical system 21 is locked in a position to view documents as they are advanced by the document feeder over the platen and record a flowing light image of the input information upon the moving photoconductive plate surface P.

Figure 2:
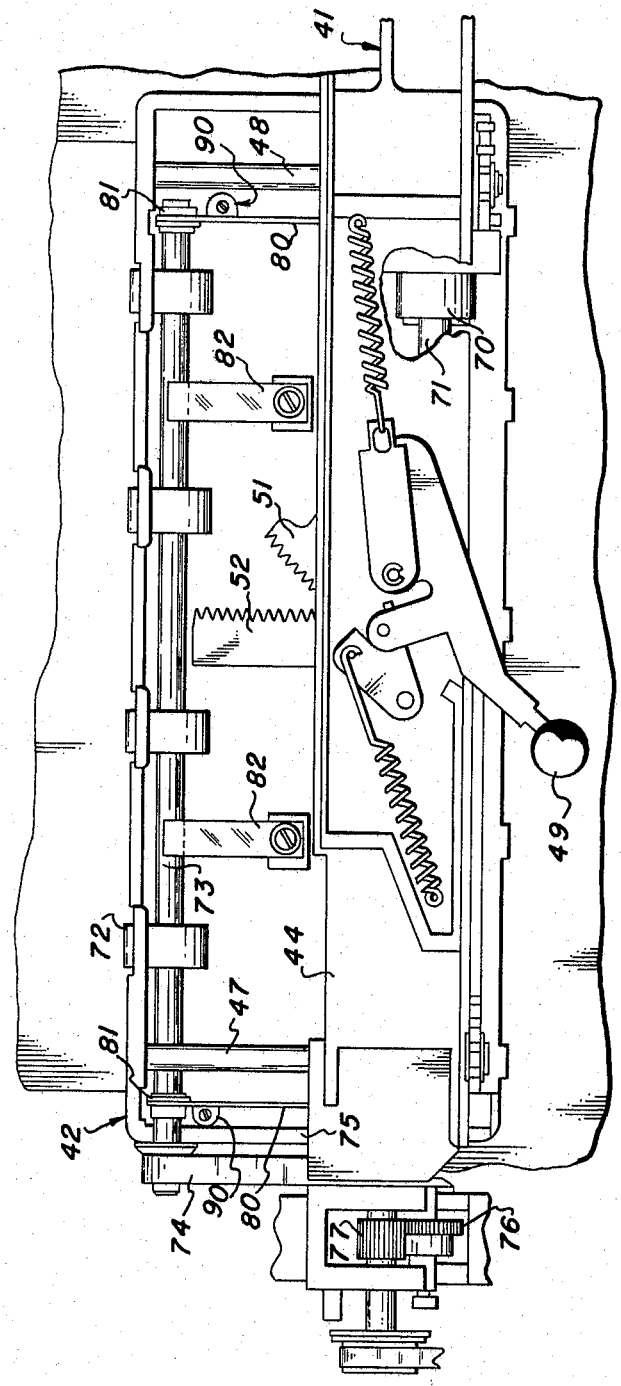
FIG. 2 is a top view of the sheet feeding apparatus of FIG. 1.

Referring now more specifically to FIGS. 1 and 2, there is shown the document feeding mechanism 11 associated with the instant invention. During normal operations, that is, when the moving optics are utilized to provide a flowing light image of the stationary original, the document feeding assembly is maintained in a stored position (as depicted by the phantom lines shown in FIG. 1) to expose the entire platen surface area and thus provide a maximum working area to the operator.

To initiate the moving document mode of operation, the machine operator simply advances the document feeding assembly 11 from the stored position to a document feeding position with the feeding assembly extending over the left hand margin of the platen surface. Fundamentally, the document feeding mechanism is made up of two main sections which include a stationary support bridge, generally referenced 41, and a movable feed roller support section, generally referenced 42. The bridge 41 is made up of two vertically extending end support members which are securely anchored in the machine frame and upon which is secured a horizontal span 44. The feed roller support section 42 is slidably suspended from the horizontally extended span 44 by means of a pair of parallel aligned rod like guide rails 47, 48 which are slidably supported in bearings (not shown) affixed to the underside of the bridge span. The document feed roll assembly is thus suspended from the span so that it can be freely moved back and forth from the home or stored position adjacent to the platen 20 and an extended position over the left hand margin of the platen surface.

In practice, at the start of the moving document handling conversion cycle, the machine operator grasps a lever arm 49 mounted on top of the bridge span and rotates the arm in a clockwise direction as shown in FIG. 2. The lever arm is operatively connected to segmented pinion 51 which meshes with a rack 52 secured to the feed roller assembly 42. Movement of the arm in a clockwise direction causes the movable feed roller assembly to be advanced toward the fully extended or operative position. Rotation of the arm in the opposite direction produces the opposite result.

Manually moving the feed roller support assembly 42 to the extended position also physically closes the contacts of the large document mode switch (not shown) causing a signal to be sent to the main machine drive motor (not shown) actuating the motor. At the same time, a signal is also sent to the machine logic control system placing the machine in a single copy mode of operation. This latter step is required in order to move the optical system from its normal rest position, which is the start of scan position at the left hand end of the platen surface, to the end of scan position beneath the now fully extended feed roll assembly. However, during this initial conversion phase, no original is actually being processed and there is, therefore, no need to feed copy sheets through the copier. In point of fact, feeding a copy sheet during the conversion phase would have a deleterious effect on the various machine components as well as confusing the machine programming and registering system. To prevent this occurrence, means 60, as shown in FIG. 1, are provided for inhibiting the action of the paper feeder during the period when the machine is being converted to the moving document mode of operation. Means 61 are provided for locking the optics at the end of scan position during the moving original mode of operation. Means 61 comprises a lock-out mechanism which serves to both uncouple the drive shaft from the main drive system and hold the optics rigidly in a fixed position for viewing moving documents subsequently advanced through the document feeding assembly 11.

Further details of the inhibitor means 60 and lockout means 61 may be obtained by reference to the above-noted U.S. application Ser. No. 367,996.

The movable document feed roller support section 42 of the document feeder assembly is provided with two sets of co-axially aligned rollers comprising a first set of drive rollers 70 mounted upon shaft 71 and a second set of hold down rollers 72 mounted upon hold down shaft 73. The two roller support shafts are connected by means of a timing belt 74 whereby each set of rollers is adapted to turn in coordination with the other set of rollers. Shaft 71 is arranged to extend beyond the end wall 75 of the movable document feeder roll support section 42 and has a gear 76 pinned thereto. In operation gear 76 is adapted to move into and out of meshing contact with the stationary driven gear 77 as the document feed roll section is moved between a stored and fully extended position. When placed in a fully extended position, as shown in FIG. 2, gear 76 meshes with gear 77 thus causing both the document feed rollers 70 and the hold down rollers 72 to be rotated. Directly below the stationary bridge and adjacent to the platen margin are a set of pinch rollers 78 (FIG. 1) which are rotatably supported in the machine frame. The pinch rollers are arranged in the machine frame so as to coact with the feed rollers 70 when the document feeder 11 is in the operative position so as to advance a document introduced therebetween. In operation, the document is moved past the viewing domain of the now fixed optical assembly 21 and then into the pinch between the hold down rollers 72 and the platen 20 surface. The hold down rollers 72 serve to hold the document in sliding contact with the platen surface as the original is being moved past the optics.

The rolls 70 and 72 in the feeder 11 shown are continuously driven during machine operation even when no sheet is being fed.

Figure 3:
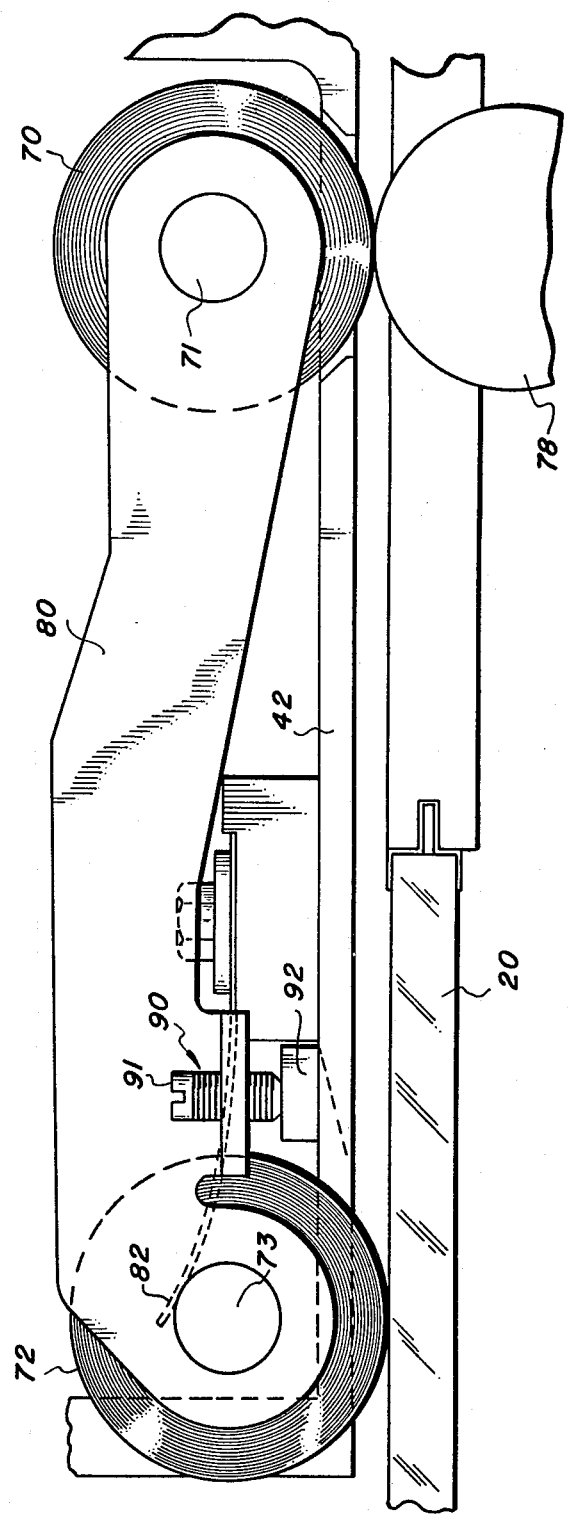
FIG. 3 is a partial side view of the sheet feeding apparatus of FIG. 1 showing the biasing means in accordance with the present invention.

Referring now to FIGS. 2 and 3, it is apparent that the shaft 73 which carries the rolls 72 is pivotably supported against the platen 20 by means of arms 80. The shaft 71 is journaled for rotation in the arms 80 by means of bearings 81. The arms are pivotably supported about the shaft 71. The rolls 72 are biased against the platen by means of leaf springs 82 which act upon the shaft 73. The springs 82 are mounted to the support section 42 in a cantilever fashion. The springs 82 are operative to bias the rolls against the platen with a given force normal to the platen.

The amount of the normal force which is to be applied is determined by the amount of force required to properly feed documents across the platen. It has been found as aforenoted, that the normal force required to obtain consistent and uniform feeding of documents across the platen for most grades of paper or other stock being fed is sufficiently large so as to cause abrasion of the platen.

Therefore, in accordance with one embodiment of this invention, a means 90 is provided for reducing the normal force applied to the platen 20 when no sheet is being fed. In the embodiment shown, this reducing means 90 comprises a set screw 91 in threaded engagement in each of the pivoting arms 80 which support the hold down rolls 72 and an anvil 92 supported by the feed roll support section 42. By adjusting the set screws 91 in against the anvils 92 the arms 80 are lifted against the action of the leaf springs 82. Therefore, a portion of the force which is applied by the leaf springs against the shaft 73 is taken up or absorbed by the set screw and anvil arrangement, thereby reducing the normal force applied by the rolls 72 against the platen glass 20.

Referring now to FIG. 4, the operation of the apparatus 11 in accordance with this invention is illustrated in greater detail. FIG. 4A shows an apparatus in accordance with this invention with the set screw 91 withdrawn from any contact with the anvil 92. Under this circumstance the full force of the leaf springs 82 are applied on the rolls 72 through shaft 73. The rolls themselves are made of a material such as polyurethane having some degree of resiliency. Under the full force of the leaf springs, the rolls will compress forming the flat tire shown in an exaggerated form. The degree of compression may be only one or two thousandths of an inch in radial direction. However, that degree of compression is enough to cause the sheet as it intercepts the hold down rolls 72 to intercept them far enough away from the point of tangency for an uncompressed roll so as to sometimes cause the momentary hesitation previously noted and the resulting skip or smear type copy defect.

FIG. 4B shows the apparatus 11 with the normal force reducing means 90 in accordance with this invention in engagement when no sheet is being fed. It should be apparent by reference to FIG. 4B that a portion of the force exerted by the springs 82 which would otherwise contribute to the normal force exerted by the roll 72 against the platen 20 has been absorbed by the set screw 91 acting against the anvils 92. As shown, the result is the reduction or elimination of the flat tire on the feed rolls 72 and a substantial reduction in the normal force exerted by the feed rolls against the platen. So, for example, if the normal force exerted by the feed rolls against the platen in FIG. 4A were on the order of two pounds, one could by means of the set screw adjustment of FIG. 4B, reduce this normal force to perhaps on the order of one pound when no sheet is being fed. The specific forces utilized, of course, will depend on the specific application, namely, the weight and thickness of the documents being fed and the amount of normal force which can be tolerated by the platen without causing severe abrasion.

Referring now to FIG. 4C, the action of the feeder is shown when feeding a sheet. As seen therein, feeding the document causes the rolls 72 to elevate the arm 80 and thereby lift the set screw 91 out of contact with the anvil 92. With the set screw out of contact with the anvil, the whole normal force due to the springs 82 is applied by the rolls against the sheet and the platen. In the previously noted example this force would have been about two pounds.

Therefore, it is apparent that in accordance with this invention a means has been provided in a document feeder for biasing the rolls 72 against a transparent platen 20 with a first normal force when no sheets are being fed and step-wise increasing it to a second normal force substantially greater than the first normal force when a sheet is being fed. In this manner, an adequate normal force for proper sheet feeding is employed during the sheet feeding cycle, and a lower normal force is employed when no sheet is being fed so as to reduce platen abrasion. This is particularly significant in the apparatus shown and described since the hold down rolls 72 normally driven during machine operation even when no document is being fed.

It is also apparent from the foregoing description, that the preferred means for providing the application of varying normal forces by the rolls 72 depending on whether a sheet is or is not being fed, is to bias the rolls against the platen with the full normal force or second normal force and then provide a means for reducing the normal force applied by the rolls when no sheet is being fed. In the embodiment shown the use of the set screw adjustment 91 and anvils 92 supported by the feed roll support section 42 comprise that means.

While the invention has been described by reference to applying a full normal force load when feeding a sheet and reducing the load when no sheet is fed the same result could be obtained by applying a low normal force when a sheet is absent and an additional normal force component when a sheet is being fed.

Figure 5:
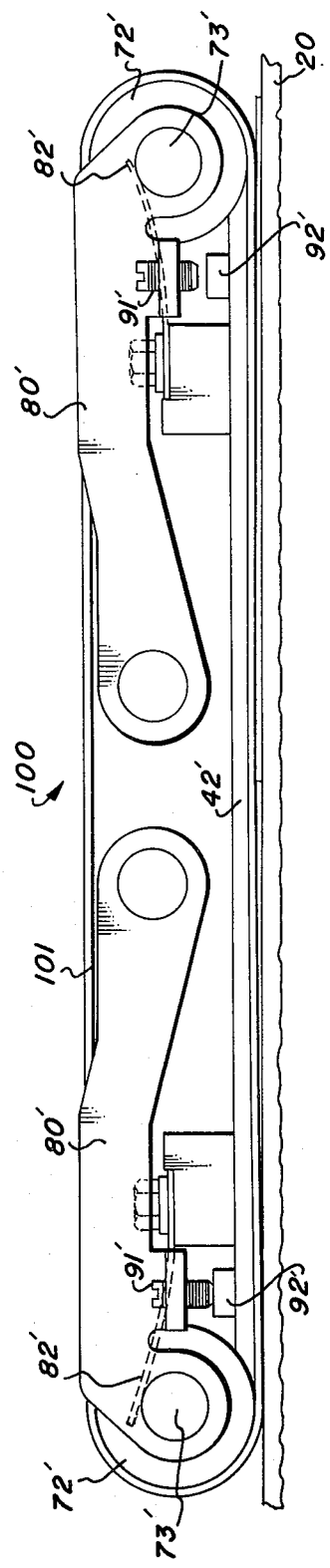
FIG. 5 is a side view of a sheet feeding apparatus in accordance with another embodiment of this invention employing a belt type transport.

While the invention has been thus far described with reference to the use of rolls as the feeding means, it would be equally applicable to a belt type document feeding system 100 as shown in FIG. 5. This system is particularly useful for an apparatus 10 wherein the original document is scanned in the stationary condition such as those set forth in the above-noted U.S. patents cited in the background of this invention.

As shown in FIG. 5, a web or belt 101 is supported about the rolls 72' in accordance with this invention. The rolls 72' are biased against the platen 20 by means of leaf springs 82' just as in the previous embodiment. The rolls 72' are also pivotably supported by means of pivot arms 80', and each pivot arm includes a set screw 91'. The roll support 42' carries anvil 92' as in accordance with the previously described feeder. In operation the normal force exerted by each of the rolls 72' against the platen 20 would vary depending on whether a sheet was being fed or not. When no sheet is being fed under a set of rolls 72', as shown on the left hand side of the Figure, then the normal force exerted by those rolls through that belt 101 against the platen 20 would be reduced through the action of the set screws 91' against the anvils 92' as in the previous embodiment. When a sheet is being fed as shown on the right hand side of the Figure, then the normal force is increased to maintain proper sheet feeding again just as in the previous example. The interposition of the sheet between the platen and the rolls 72' causes the arms 80' to pivot and lift the screws 91' off the anvils 92'.

Therefore, it should be readily apparent that the biasing means 90 or 90' in accordance with this invention which is adapted to provide a first normal force when no sheet is being fed and a second normal force greater than the first when a sheet is being fed is equally applicable to a belt type feeder or a roll type feeder. It is apparent, however, that for a belt type feeder the normal force application just alluded to would be the application of normal force under the belt pulleys or rolls 72' in accordance with this invention. The normal force exerted by the belt 101 itself where it is unsupported would be a function of the belt tension, and would not be necessarily affected by the biasing means of this invention.

The sheet feeding apparatus 11 of this invention including the aforenoted biasing means 90, has provided a substantial reduction in the degree of abrasion of the platen surface when no document is being fed. It has further provided in the embodiment shown in FIGS. 1 through 4, a high degree of improvement in the reduction of the skips or smear type copy defect previously described.

The patents and applications specifically set forth in this application are meant in every respect to be incorporated by reference into the description.

It is apparent that there has been provided in accordance with this invention, a document feeding apparatus which fully satisfies the objects, means and advantages set forth hereinbefore. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

What is claimed is:

1. An apparatus for feeding individual sheets over a transparent platen comprising:
    means for feeding said sheets over said platen, said feeding means comprising at least one roll;
    means for biasing said roll against said platen, said biasing means comprising a first means for biasing said roll against said platen with a desired force normal to said platen when no sheet is being fed, and a second means for providing an additional force component for stepwise substantially increasing said force normal to said platen to an amount greater than said desired normal force when a sheet is being fed.

2. An apparatus as in claim 1, wherein said second means comprises means operative when a sheet is being fed for biasing said roll against said platen with a total force normal to said platen comprising said desired force and said additional force, and wherein said first means comprises means for reducing said total force to said desired force when no sheet is being fed.

3. An apparatus as in claim 2 wherein said force reducing means comprises means supported by said feed means for absorbing a portion of said second force.

4. An apparatus as in claim 1 wherein a web is supported about the outer periphery of said roll.

5. An apparatus as in claim 4 including a plurality of said feeding means and said biasing means.

6. An apparatus for feeding individual sheets over a transparent platen comprising:
    means for feeding said sheets over said platen, said feeding means comprising at least one roll;
    means for biasing said roll against said platen with a first force normal to said platen when no sheet is being fed and for biasing said roll against said platen with a second force normal to said platen when a sheet is being fed, said second force being greater than said first force;
    said at least one roll being pivotally supported against said platen by means of arms; said
    said biasing means comprising at least one spring for biasing said rolls against said platen, and at least one adjustable means supported by said feed means for absorbing a portion of the force exerted by said spring.

7. An apparatus as in claim 6 wherein said adjustable means comprises a screw in threaded engagement with each of said arms and anvils supported by said feeder, said screws engaging said anvils so as to lift said arm in a direction away from said platen.

8. In a reproducing apparatus for providing one or more copies of an original document, said apparatus including;
    a transparent platen for supporting said original document;
    a moving photosensitive surface;
    means for feeding said documents over said platen;
    means for projecting an image of said document on said moving photosensitive surface; and
    means for developing said image, the improvement wherein:
    said means for feeding said documents over said platen comprises at least one roll, and means for biasing said roll against said platen, said biasing means comprising a first means for biasing said roll against said platen with a desired force normal to said platen when no sheet is being fed and second means for providing an additional normal force component for stepwise substantially increasing said force normal to said platen to an amount greater than said desired normal force when a sheet is being fed.

9. An apparatus as in claim 8, wherein said second means comprises means operative when a sheet is fed for biasing said roll against said platen with a total force comprising said desired force and said additional force, and wherein said first means comprises means for reducing said total force to said desired force when no sheet is being fed.

10. An apparatus as in claim 9 wherein said force reducing means comprises means supported by said feed means for absorbing a portion of said second force.

11. An apparatus as in claim 8 wherein a web is supported about the outer periphery of said roll.

12. An apparatus as in claim 11 including a plurality of said feeding means and said biasing means.

13. In a reproducing apparatus for providing one or more copies of an original document, said apparatus including a transparent platen for supporting said original document;
a moving photosensitive surface;
means for feeding said documents over said platen;
means for projecting an image of said document on said moving photosensitive surface; and
means for developing said image, the improvement wherein:
said means for feeding said sheets over said platen comprises at least one roll, and wherein means are provided for biasing said roll against said platen with a first force normal to said platen when no sheet is being fed and for biasing said roll against said platen with a second force normal to said platen when a sheet is being fed, said second force being greater than said first force, said at least one roll being pivotally supported against said platen by means of arms and said biasing means comprising at least one spring for biasing said rolls against said platen and at least one adjustable means supported by said feed means for absorbing a portion of the force exerted by said spring.

14. An apparatus as in claim 13 wherein said adjustable means comprises a screw in threaded engagement with each of said arms and anvils supported by said feeder, said screws engaging said anvils so as to lift said arm in a direction away from said platen.

15. An apparatus as in claim 8 wherein said projecting means comprises a fixed optical system for projecting an image of a moving original document and wherein said feeding means includes a first set of said rolls biased against said platen and a second set of feed rolls positioned upstream of said first set for feeding said document across said platen into the nip formed between said first set and said platen, said rolls advancing said document across said platen in synchronism with said moving photosensitive surface.

16. An apparatus as in claim 15 wherein said second set of feed rolls are positioned off said platen and are biased against a set of cooperating pinch rolls.

* * * * *